United States Patent
Halasa et al.

(10) Patent No.: US 7,321,017 B1
(45) Date of Patent: Jan. 22, 2008

(54) AMINE CONTAINING CATALYST SYSTEM AND METHODS OF USE THEREOF

(75) Inventors: Adel Farhan Halasa, Bath, OH (US); Wen-Liang Hsu, Cuyahoga Falls, OH (US); Chad Aaron Jasiunas, Copley, OH (US); John Robert Zuppo, III, Copley, OH (US); Lauire Elizabeth Austin, Hartville, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 11/466,920

(22) Filed: Aug. 24, 2006

(51) Int. Cl.
- *C08F 4/52* (2006.01)
- *C08F 4/48* (2006.01)
- *C08F 36/04* (2006.01)

(52) U.S. Cl. ............... 526/180; 526/176; 526/204; 502/153; 502/154; 502/155

(58) Field of Classification Search ............... 502/153, 502/154, 155; 526/176, 180, 204, 335; 524/571
See application file for complete search history.

(56) References Cited

U.S. PATENT DOCUMENTS

| | | | |
|---|---|---|---|
| 3,903,019 A * | 9/1975 | Hargis et al. ............. 502/154 |
| 4,555,498 A * | 11/1985 | Kamienski ................ 502/153 |
| 5,086,136 A * | 2/1992 | Takashima et al. ......... 526/177 |
| 6,046,266 A * | 4/2000 | Sandstrom et al. ......... 524/492 |
| 6,103,842 A | 8/2000 | Halasa et al. |
| 6,627,715 B2 | 9/2003 | Halasa et al. |
| 6,889,737 B2 | 5/2005 | Weydert |
| 2002/0045720 A1 | 4/2002 | Halasa et al. |
| 2005/0181935 A1 | 8/2005 | Halasa et al. |

* cited by examiner

*Primary Examiner*—Fred Teskin
(74) *Attorney, Agent, or Firm*—Wood, Herron & Evans

(57) ABSTRACT

The present invention is directed to an amine containing catalyst system for synthesizing rubbery polymers, such as polybutadiene rubber and styrene-butadiene rubber, having a high trans microstructure. The catalyst system, in one embodiment, includes (a) an organolithium compound, (b) a group IIa metal salt, (c) an organoaluminum compound, and (d) an amine compound which can be selected from (1) a heterocyclic aromatic compound which includes a ring structure with one or more nitrogen atoms as part of the ring; (2) a heterocyclic non-aromatic compound which includes a ring structure with two or more nitrogen atoms as part of the ring; (3) an aromatic compound including a ring structure substituted with at least one amine and at least one polar functionality containing group selected from a carboxyl group or a hydroxyl group; (4) a bicyclic chelating diamine compound; or (5) an aliphatic amine which includes a $C_5$-$C_{20}$ alkyl group.

17 Claims, No Drawings

AMINE CONTAINING CATALYST SYSTEM AND METHODS OF USE THEREOF

FIELD OF THE INVENTION

The present invention is directed to an amine containing catalyst system for synthesizing rubbery polymers, such as polybutadiene rubber and styrene-butadiene rubber, having a high trans microstructure content that can be utilized in tire tread rubbers.

BACKGROUND OF THE INVENTION

It is desirable for tires to have good wet skid resistance, low rolling resistance, tear strength, and good wear characteristics. It has traditionally been difficult to improve the wear characteristics of a tire without sacrificing wet skid resistance and traction characteristics. These properties depend, to a great extent, on the dynamic viscoelastic properties of the rubbers utilized in making the tire. Such viscoelastic properties are controlled largely by the microstructure of the elastomer.

In order to reduce the rolling resistance and to improve the treadwear characteristics of tires, rubbers having a high rebound have traditionally been utilized in making tire tread rubber compounds. On the other hand, in order to increase the wet skid resistance of a tire, rubbers that undergo a large energy loss have generally been utilized in the tread of the tire. In order to balance these two viscoelastically inconsistent properties, mixtures of various types of synthetic and natural rubber are normally utilized in tire treads. For instance, various mixtures of styrene-butadiene rubber and polybutadiene rubber are commonly used as a rubbery material for automobile tire treads.

It has been generally conventionally believed to be desirable, e.g., for styrene-butadiene rubber, when utilized in tire tread compounds, to have a high level of vinyl content (1,2-microstructure). To this end, styrene-butadiene rubbers are often synthesized by solution polymerization that is conducted in the presence of a catalyst system, including one or more modifying agents. In contrast to providing high vinyl content rubbery polymers, it is believed that rubbery polymers having high trans microstructure contents may provide a more desirable balance of tire tread properties.

Thus, it is desirable to provide catalyst systems for synthesizing rubbery polymers, such as polybutadiene rubber and styrene-butadiene rubber, having a high trans microstructure content, wherein the rubbery polymers can provide desirable wear properties without substantially sacrificing other performance characteristic(s), e.g., traction properties.

SUMMARY OF THE INVENTION

In accordance with an embodiment of the present invention, an amine containing catalyst system is provided which includes (a) an organolithium compound, (b) a group IIa metal salt that can be selected from the group consisting of group IIa metal salts of amino glycol and group IIa metal salts of glycol ethers, (c) an organoaluminum compound, and (d) an amine compound which can be selected from (1) a heterocyclic aromatic compound which includes a ring structure with one or more nitrogen atoms as part of the ring; (2) a heterocyclic non-aromatic compound which includes a ring structure with two or more nitrogen atoms as part of the ring; (3) an aromatic compound including a ring structure substituted with at least one amine and at least one polar functionality containing group selected from a carboxyl group or a hydroxyl group; (4) a bicyclic chelating diamine compound; or (5) an aliphatic amine which includes a $C_5$-$C_{20}$ alkyl group. The catalyst system may further optionally include an organomagnesium compound.

The catalyst system will catalyze the copolymerization of one or more conjugated diolefin monomers with vinyl aromatic monomers into copolymer rubbers, such as styrene-butadiene rubber, having a high trans microstructure content. This catalyst system will also catalyze the polymerization of conjugated diolefin monomers, such as 1,3-butadiene and isoprene, into rubbery polymers having a high trans microstructure content. High trans styrene-butadiene rubber and high trans-1,4-polybutadiene rubber that is synthesized using the catalyst system of this invention is useful in the preparation of tire tread rubber compounds which exhibit improved wear and tear characteristics, such as tread compounds that contain high levels of silica.

By virtue of the foregoing, there is thus provided an amine containing catalyst system for synthesizing rubbery polymers, such as polybutadiene rubber and styrene-butadiene rubber, having a high trans microstructure content, wherein the rubbery polymers provide desirable wear properties without substantially sacrificing other performance characteristic(s), e.g., traction properties.

DETAILED DESCRIPTION

An amine containing catalyst system is provided which includes (a) an organolithium compound, (b) a group IIa metal salt that can be selected from the group consisting of group IIa metal salts of amino glycol and group IIa metal salts of glycol ethers, (c) an organoaluminum compound, and (d) an amine compound. The amine containing catalyst system synthesizes rubbery polymers, such as polybutadiene rubber and styrene-butadiene rubber, having a high trans microstructure content that can be utilized in tire tread rubbers, with the polymerizations typically carried out in a hydrocarbon solvent, as further discussed in detail below.

The organolithium compounds of the catalyst system can include the monofunctional and multifunctional initiator types known for polymerizing the conjugated diolefin monomers. The multifunctional organolithium initiators can be either specific organolithium compounds or can be multifunctional types that are not necessarily specific compounds but rather represent reproducible compositions of regulable functionality. The organolithium initiator can also be a functionalized compound.

The choice of initiator can be governed by the degree of branching and the degree of elasticity desired for the polymer, the nature of the feedstock, and the like. With regard to the feedstock employed as the source of conjugated diene, for example, the multifunctional initiator types generally are selected when a low concentration diene stream is at least a portion of the feedstock since some components present in the unpurified low concentration diene stream may tend to react with carbon lithium bonds to deactivate the activity of the organolithium compound, thereby necessitating the presence of sufficient lithium functionality so as to override such effects.

The multifunctional organolithium compounds which can be used include those prepared by reacting an organomonolithium compounded with a multivinylphosphine or with a multivinylsilane, such a reaction typically being conducted in an inert diluent, such as a hydrocarbon or a mixture of a hydrocarbon and a polar organic compound. The reaction between the multivinylsilane or multivinylphosphine and the organomonolithium compound can result in a precipitate which can be solubilized, if desired, by adding a solubilizing monomer such as a conjugated diene or monovinyl aromatic compound after reaction of the primary components. Alternatively, the reaction can be conducted in the presence of a minor amount of the solubilizing monomer. The relative amounts of the organomonolithium compound and the multivinylsilane or the multivinylphosphine generally should be in the range of about 0.33 to 4 moles of organomonolithium compound per mole of vinyl groups present in the multivinylsilane or multivinylphosphine employed. It is noted that such multifunctional initiators are commonly used as mixtures of compounds rather than as specific individual compounds.

The organomonolithium compounds can include ethyl lithium, isopropyl lithium, n-butyllithium, sec-butyllithium, n-heptyllithium, tert-octyl lithium, n-eicosyl lithium, phenyl lithium, 2-naphthyllithium, 4-butylphenyllithium, 4-tolyl-lithium, 4-phenylbutyllithium, cyclohexyl lithium, and others known to those having ordinary skill in the art.

The multivinylsilane compounds can include tetravinyl-silane, methyltrivinyl silane, diethyldivinylsilane, di-n-dodecyldivinylsilane, cyclohexyltrivinylsilane, phenyltrivi-nylsilane, benzyltrivinylsilane, (3-ethylcyclohexyl)(3-n-butylphenyl)divinylsilane, and others known to those having ordinary skill in the art.

The multivinylphosphine compounds can include trivi-nylphosphine, methyldivinylphosphine, dodecyldivi-nylphosphine, phenyldivinylphosphine, cyclooctyldivi-nylphosphine, and others known to those having ordinary skill in the art.

Other multifunctional polymerization initiators can be prepared by utilizing an organomonolithium compound further in combination with a multivinylaromatic compound and either a conjugated diene or monovinylaromatic compound or both. These ingredients can be charged initially, usually in the presence of a hydrocarbon or a mixture of a hydrocarbon and a polar organic compound as a diluent. Alternatively, a multifunctional polymerization initiator can be prepared in a two-step process by reacting the organo-monolithium compound with a conjugated diene or monovi-nyl aromatic compound additive, and then adding the multivinyl aromatic compound. Any of the conjugated dienes or monovinyl aromatic compounds described can be employed. The ratio of conjugated diene or monovinyl aromatic compound additive employed, in one example, should be in the range of about 2 to 15 moles of polymerizable compound per mole of organolithium compound. The amount of multivi-nylaromatic compound employed, in one example, should be in the range of about 0.05 to 2 moles per mole of organomonolithium compound.

The multivinyl aromatic compounds can include 1,2-divinylbenzene, 1,3-divinylbenzene, 1,4-divinylbenzene, 1,2,4-trivinylbenzene, 1,3-divinylnaphthalene, 1,8-divinyl-naphthalene, 1,3,5-trivinylnaphthalene, 2,4-divinylbiphe-nyl, 3,5,4'-trivinylbiphenyl, m-diisopropenyl benzene, p-di-isopropenyl benzene, 1,3-divinyl-4,5,8-tributylnaphthalene, and others known to those having ordinary skill in the art. In one example, the multivinyl aromatic compound includes a divinyl aromatic hydrocarbon containing up to 18 carbon atoms per molecule. In another example, the divinyl aromatic hydrocarbon can include divinylbenzene, as either the ortho, meta or para isomer, commercial divinylbenzene, which is a mixture of the three isomers, or other compounds such as the ethyl styrenes.

Other types of multifunctional lithium compounds can be used, such as those prepared by contacting a sec- or tert-organomonolithium compound with 1,3-butadiene, at a ratio of about 2 to 4 moles of the organomonolithium compound per mole of the 1,3-butadiene, in the absence of added polar material, with the contacting, for example, being conducted in an inert hydrocarbon diluent. In another example, the contacting is conducted without the diluent.

Alternatively, specific organolithium compounds can be used as initiators, if desired, in the preparation of the rubbery polymers. These can be represented by R(Li)x wherein R represents a hydrocarbyl radical containing from 1 to 20 carbon atoms, and wherein x is an integer of 1 to 4. The organolithium compounds can include methyl lithium, iso-propyl lithium, n-butyllithium, sec-butyllithium, hexyl-lithium, tert-octyl lithium, n-decyl lithium, phenyl lithium, 1-naphthyllithium, 4-butylphenyllithium, p-tolyl lithium, 4-phenylbutyllithium, cyclohexyl lithium, 4-butylcyclo-hexyllithium, 4-cyclohexylbutyllithium, dilithiomethane, 1,4-dilithiobutane, 1,10-dilithiodecane, 1,20-dilithioe-icosane, 1,4-dilithiocyclohexane, 1,4-dilithio-2-butane, 1,8-dilithio-3-decene, 1,2-dilithio-1,8-diphenyloctane, 1,4-dil-ithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and others known to those having ordinary skill in the art.

The organolithium compound can be an alkylsilyloxy protected functional lithium compound as described in U.S. Provisional Application Ser. No. 60/234,686. The teachings of U.S. Provisional Application Ser. No. 60/234,686 are incorporated herein by reference. For instance, the initiator can be an alkylsilyloxy protected functional lithium initiator of the structural formula:

wherein X represents a group IVa element selected from carbon, germanium, or tin; wherein R represents alkyl groups that can be the same or different and that contain from 1 to about 8 carbon atoms; and wherein A represents an alkylene group; or:

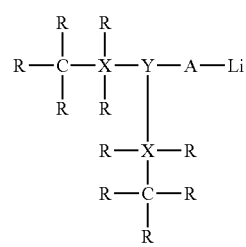

wherein X represents a group IVa element selected from carbon, germanium, or tin; wherein Y represents phospho-rous or nitrogen; wherein R represents alkyl groups that can be the same or different and that contain from 1 to about 8 carbon atoms; and wherein A represents an alkylene group; or (c):

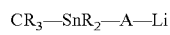

wherein R represents alkyl groups that can be the same or different and that contain from 1 to about 8 carbon atoms, and wherein A represents an alkylene group. The alkylene group can be straight chained or branched. For instance, A can represent a straight chained alkylene group of the structural formula —$(CH_2)_n$— or it can represent a branched alkylene group, such as:

wherein R represents alkyl groups that can be the same or different and that contain from 1 to about 8 carbon atoms. In one example, R represents an alkyl group containing from 1 to about 4 carbon atoms. In another example, R represents methyl groups.

The alkylsilyloxy protected functional lithium initiator will typically be of the structural formula:

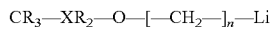

wherein X represents a group IVa element selected from carbon, silicon, germanium, or tin; wherein n represents an integer from 1 to 10; wherein R represents alkyl groups that can be the same or different and that contain from 1 to about 8 carbon atoms; or an alkylsilyloxy protected functional lithium compound of the structural formula:

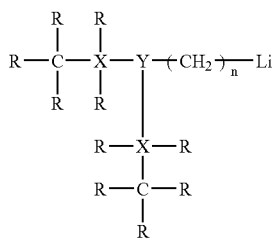

wherein X represents a group IVa element selected from carbon, silicon, germanium, or tin; wherein Y represents phosphorous or nitrogen; wherein n represents an integer from 1 to 10; wherein R represents alkyl groups that can be the same or different and that contain from 1 to about 8 carbon atoms. These rubbery polymers will accordingly normally contain a "living" lithium chain end.

In another example, the alkylsilyloxy protected functional lithium initiator may be of the structural formula:

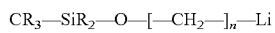

wherein n represents an integer from 1 to 10, and wherein R represents alkyl groups that can be the same or different and that contain from 1 to about 8 carbon atoms.

The group IIa metal salts used in the catalyst systems can be selected from the group consisting of group IIa metal salts of amino glycols or group IIa metal salts of glycol ethers. The group IIa metal salts of amino glycols may be represented by the structural formula:

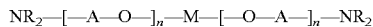

wherein the R groups can be the same or different and represent alkyl groups (including cycloalkyl groups), aryl groups, alkaryl groups or arylalkyl groups; wherein M represents a group IIa metal selected from beryllium, magnesium, calcium, strontium, or barium; wherein n represents an integer from 2 to about 10; and wherein A represents an alkylene group that contains from about 1 to about 6 carbon atoms. In one example, M represents strontium or barium. In another example, M represents barium. In one example, A represents an alkylene group that contains from 2 to about 4 carbon atoms. In another example, A represents an ethylene group that contains from 2 to about 4 carbon atoms. In cases where R represents an alkyl group, the alkyl group will typically contain from 1 to about 12 carbon atoms. In one example, the R represents an alkyl group that contains from about 1 to about 8 carbon atoms or a cycloalkyl group that contains from about 4 to about 8 carbon atoms. In another example, R represents an alkyl group that contains from about 1 to about 4 carbon atoms. In another example, n represents an integer from about 2 to about 4. In cases where R represents an aryl group, an alkaryl group, or arylalkyl group, the aryl group, alkaryl group, or arylalkyl group will typically contain from about 6 to about 12 carbon atoms.

In cases where R represents cycloalkyl groups, the group IIa metal salt will be of the structural formula:

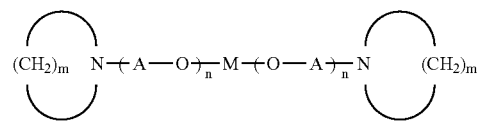

wherein m represents an integer from 4 to about 8; wherein n represents an integer from 2 to about 10; wherein M represents a group IIa metal selected from beryllium, magnesium, calcium, strontium, or barium; wherein A represents an alkylene group that contains from about 1 to about 6 carbon atoms, and wherein the A groups can be the same or different. In one example, m represents an integer from 5 to about 7, n represents an integer from about 2 to about 4, A represents an alkylene group that contains from 2 to about 4 carbon atoms. In another example, A represents ethylene groups. In another example, M represents strontium or barium. In yet another example, M represents barium.

Some representative examples of barium salts where R represents cycloalkyl groups include:

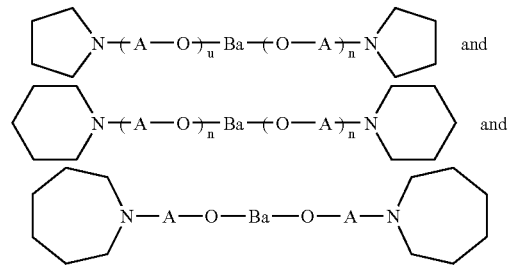

wherein A represents ethylene groups, wherein the A groups can be the same or different, and wherein n represents the integer 2.

The barium salt can also contain a cycloalkyl group that contains an oxygen atom. For example, the barium salt can be of the structural formula:

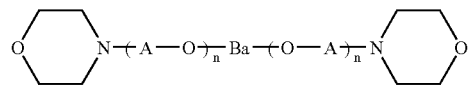

wherein A represents ethylene groups, wherein the A groups can be the same or different, and wherein n represents the integer 2.

The group IIa metal salt of glycol ethers may be represented by the structural formula:

wherein M represents a group IIa metal selected from beryllium, magnesium, calcium, strontium, or barium; wherein n represents an integer from 2 to 10; wherein m represents an integer from 1 to 6; and wherein x represents an integer from 1 to 12. In one example, n represents an integer from 2 to about 4, m represents an integer from 2 to 8, and x represents an integer from 1 to 8. In another example, n represents an integer from 2 to 3, m represents an integer from 2 to 4, and x represents an integer from 1 to 4. In another example, M represents strontium or barium. In yet another example, M represents barium.

In another embodiment, the group IIa metal salt is the barium salt of di(ethyleneglycol)ethyl ether which is of the structural formula:

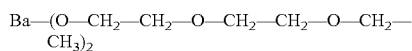

In another embodiment, the group IIa metal salt is

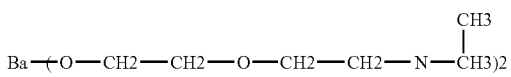

In other embodiments, the group IIa metal salts include barium salts of tri(ethyleneglycol)ethyl ethers and barium salts of tetra(ethyleneglycol)ethyl ethers.

The molar ratio of the organolithium compound to the group IIa metal salt will typically be within the range of about 0.1:1 to about 20:1. In one example, the molar ratio is within the range of 0.5:1 to about 15:1. In another example, the molar ratio of the organolithium compound to the group IIa metal salt is within the range of about 1:1 to about 6:1. In yet another example, the molar ratio is within the range of about 2:1 to about 4:1.

The organolithium compound will normally be present in the polymerization medium in an amount that is within the range of about 0.01 to about 1.5 phm (parts by 100 parts by weight of total monomer). In one example, from about 0.01 phm to about 1.2 phm of the organolithium compound can be utilized. In another example, from about 0.025 phm to about 0.07 phm of the organolithium compound in the polymerization medium can be utilized.

The organoaluminum compounds of the catalyst system can be represented by the structural formula:

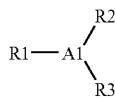

in which R1 is selected from alkyl groups (including cycloalkyl), aryl groups, alkaryl groups, arylalkyl groups, or hydrogen; R2 and R3 being selected from alkyl groups (including cycloalkyl), aryl groups, alkaryl groups, or arylalkyl groups. R1, R2, and R3, for example, can represent alkyl groups that contain from 1 to 8 carbon atoms. Some representative examples of organoaluminum compounds that can be utilized are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride and benzyl isopropyl aluminum hydride, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorganoaluminum compounds. The preferred organoaluminum compounds include tridodecylaluminum, tri-n-octylaluminum, tri-n-decylaluminum, triethyl aluminum (TEAL), tri-n-propyl aluminum, triisobutyl aluminum (TIBAL), trihexyl aluminum, and diisobutyl aluminum hydride (DIBA-H).

In one example, the organoaluminum compound can contain less than 13 carbon atoms. Such organoaluminum compounds include trimethylaluminum, triethylaluminum, tri-n-propylaluminum, tri-iso-propylaluminum, tri-isbutylaluminum, tri-t-butylaluminum, and tri-n-butylaluminum.

The molar ratio of the organoaluminum compound to the group IIa metal salt is within the range of about 0.1:1 to about 20:1. In another example, the molar ratio is from about 0.5:1 to about 15:1. In another example, the molar ratio of the organoaluminum compound to the group IIa metal salt is within the range of about 1:1 to about 8:1. In yet another example, the molar ratio is within the range of about 2:1 to about 6:1.

The organoaluminum compound will normally be present in the polymerization medium in an amount that is within the range of about 1.2 to about 2.0 phm (parts by 100 parts by weight of total monomer). In another example, from about 1.4 phm to about 1.8 phm of the organoaluminum compound can be utilized.

The amine compound of the catalyst system can be selected from (1) a heterocyclic aromatic compound which includes a ring structure with one or more nitrogen atoms as part of the ring; (2) a heterocyclic non-aromatic compound which includes a ring structure with two or more nitrogen atoms as part of the ring; (3) an aromatic compound including a ring structure substituted with at least one amino group and at least one polar functionality containing group selected from a carboxyl group or a hydroxyl group; (4) a bicyclic chelating diamine compound; or (5) an aliphatic amine which includes a $C_5$-$C_{20}$ alkyl group.

The heterocyclic aromatic compounds, which are defined by a ring structure with one or more nitrogen atoms as part of the ring, can include, for example, substituted or unsubstituted 3-, 4-, 5-, or 6-membered ring structures with one or more nitrogen atoms as part of the ring. These compounds may include fused ring structures. Examples of the heterocyclic aromatic compounds can include pyrrole, quinoline, pyridine, 2-picoline, 3-picoline, 4-picoline, pyridazine, pyrimidine, pyrazine, and others known to those having ordinary skill in the art.

The heterocyclic non-aromatic compounds, which are defined by a ring structure with two or more nitrogen atoms as part of the ring, can include, for example, substituted or unsubstituted 3-, 4-, 5-, or 6-membered ring structures with two or more nitrogen atoms as part of the ring. These compounds may include fused ring structures. Examples of the heterocyclic non-aromatic compounds can include piperazine, N,N-dimethyl piperazine, N-methyl piperazine, and others known to those having ordinary skill in the art.

The aromatic compounds, which are defined by a ring structure substituted with at least one amine and at least one polar functionality containing group selected from a carboxyl group or a hydroxyl group, can include, for example, 3-, 4-, 5-, or 6-membered substituted rings, such substitution including at least one amino group and at least one polar functionality containing group selected from a carboxyl group or a hydroxyl group. In one example, the amine is a primary amine. These compounds also may include fused ring structures. Examples of the aromatic compound may include para-aminobenzoic acid (PABA), para-aminophenol (AP), as well as others known to those having ordinary skill in the art.

The bicyclic chelating diamine compound generally may be defined as two fused rings with at least one ring including two nitrogen atoms. For example, the bicyclic chelating diamine compound may include 1,4-diazabicyclo[2.2.2]octane (DABCO) and others known to those having ordinary skill in the art. The aliphatic amine, which includes a $C_5$-$C_{20}$ alkyl group, may be a primary, secondary, or tertiary amine. In one example, the aliphatic amine is a primary amine, such as octyl amine or others known to those having ordinary skill in the art.

The molar ratio of the amine compound to the group IIa metal salt is within the range of about 0.1:1 to about 20:1. In another example, the molar ratio is from about 0.5:1 to about 15:1. In another example, the molar ratio of the amine compound to the group IIa metal salt is within the range of about 1:1 to about 8:1. In yet another example, the molar ratio is within the range of about 1:1 to about 6:1.

The amine compound will normally be present in the polymerization medium in an amount, which is within the range of about 0.20 to about 8.00 phm (parts by 100 parts by weight of total monomer).

The catalyst system may further optionally include an organomagnesium compound. The optional organomagnesium compound may include any magnesium compound that contains at least one magnesium-carbon bond and that is soluble in a hydrocarbon solvent. Some specific examples of suitable organomagnesium compounds include dihydrocarbylmagnesium compounds, such as diethylmagnesium, di-n-propylmagnesium, diisopropylmagnesium, dibutylmagnesium, dihexylmagnesium, diphenylmagnesium, dibenzylmagnesium, and mixtures thereof, methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, benzylmagnesium phenoxide, and mixtures thereof.

Coupling agents also can be used when synthesizing the rubbery polymers to improve the cold flow characteristics of the rubber and rolling resistance of tires made therefrom. It also leads to better processability and other beneficial properties. A wide variety of compounds suitable for such purposes can be employed. Some representative examples of suitable coupling agents include: multivinylaromatic compounds, multiepoxides, multiisocyanates, multiimines, multialdehydes, multiketones, multihalides, multianhydrides, multiesters which are the esters of polyalcohols with monocarboxylic acids, and the diesters which are esters of monohydric alcohols with dicarboxylic acids, and the like.

Examples of suitable multivinylaromatic compounds include divinylbenzene, 1,2,4-trivinylbenzene, 1,3-divinylnaphthalene, 1,8-divinylnaphthalene, 1,3,5-trivinylnaphthalene, 2,4-divinylbiphenyl, and others known to those having ordinary skill in the art. In one example, the divinylaromatic hydrocarbons are used, such as divinylbenzene, in either its ortho, meta or para isomer. In another example, commercial divinylbenzene, which is a mixture of the three isomers and other compounds, is used.

While any multiepoxide can be used, in one example, liquids are used since they are more readily handled and form a relatively small nucleus for the radial polymer. In another example, the multiepoxides are epoxidized hydrocarbon polymers, such as epoxidized liquid polybutadienes. In another example, epoxidized vegetable oils, such as epoxidized soybean oil and epoxidized linseed oil, are used. In yet another example, the epoxy compound includes 1,2,5,6,9,10-triepoxydecane, and others known to those having ordinary skill in the art.

Examples of suitable multiisocyanates include benzene-1,2,4-triisocyanate, naphthalene-1,2,5,7-tetraisocyanate, and others known to those having ordinary skill in the art. In one example, the multiisocyanate is a commercially available product known as PAPI-1, which is a polyarylpolyisocyanate having an average of three isocyanate groups per molecule and an average molecular weight of about 380. Such a compound can be visualized as a series of isocyanate-substituted benzene rings joined through methylene linkages.

The multiimines, which are also known as multiaziridinyl compounds, can include those compounds containing three or more aziridine rings per molecule. Examples of such compounds include the triaziridinyl phosphine oxides or sulfides, such as tri(1-ariridinyl)phosphine oxide, tri(2-methyl-1-ariridinyl)phosphine oxide, tri(2-ethyl-3-decyl-1-ariridinyl)phosphine sulfide, and others known to those having ordinary skill in the art.

The multialdehydes can include 1,4,7-naphthalene tricarboxyaldehyde, 1,7,9-anthracene tricarboxyaldehyde, 1,1,5-pentane tricarboxyaldehyde and similar multialdehyde containing aliphatic and aromatic compounds. The multiketones can include 1,4,9,10-anthraceneterone, 2,3-diacetonylcyclohexanone, and others known to those having ordinary skill in the art. Examples of the multianhydrides include pyromellitic dianhydride, styrene-maleic anhydride copolymers, and others known to those having ordinary skill in the art. Examples of the diesters and multiesters include diethyladipate, triethyl citrate, 1,3,5-tricarbethoxybenzene, diethyl phathalate, ethyl benzoate, and others known to those having ordinary skill in the art.

The multihalides can include silicon tetrahalides (such as silicon tetrachloride, silicon tetrabromide and silicon tetraiodide) and the trihalosilanes, (such as trifluorosilane, trichlorosilane, trichloroethylsilane, tribromobenzylsilane and the like). In another example, the multihalide can include multihalogen-substituted hydrocarbons, such as 1,3,5-tri(bromomethyl)benzene, 2,4,6,9-tetrachloro-3,7-decadiene, and others known to those having ordinary skill in the art, in which the halogen is attached to a carbon atom which is alpha to an activating group, such as an ether linkage, a carbonyl group or a carbon-to-carbon double bond. Substituents inert with respect to lithium atoms in the terminally reactive polymer can also be present in the active halogen-containing compounds. Alternatively, other suitable reactive groups different from the halogen as described above can be present.

Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2,4,5-diepoxy-3-pentanone, 1,2,4,5-diepoxy-3-hexanone, 1,2,11,12-diepoxy-8-pentadecanone, 1,3,18,19-diepoxy-7,14-eicosanedione, and others known to those having ordinary skill in the art.

In addition to the silicon multihalides as described hereinabove, other metal multihalides, such as those of tin, lead or germanium, also can be readily employed as coupling and branching agents. Difunctional counterparts of these agents also can be employed, whereby a linear polymer rather than a branched polymer results. Mixed coupling agents containing both silicon multihalides and tin multihalides can also be used.

In one embodiment, a range of about 0.01 to 4.5 milliequivalents of coupling agent is employed per 100 grams of monomer. In one example, about 0.01 to about 1.5 milliequivalents of the coupling agent per 100 grams of monomer is used to obtain the desired Mooney viscosity. Larger quantities tend to result in production of polymers containing terminally reactive groups or insufficient coupling. One equivalent of treating agent per equivalent of lithium is considered optimum amount for maximum branching, if this result is desired in the production line. The coupling agent can be added in the hydrocarbon solution (e.g., in cyclohexane) to the polymerization admixture in the final reactor with suitable mixing for distribution and reaction.

As discussed above, the amine containing catalyst system synthesizes rubbery polymers, such as polybutadiene rubber and styrene-butadiene rubber, having a high trans microstructure content that can be utilized in tire tread rubbers. The rubber polymers can be synthesized from conjugated diolefin monomers, such as 1,3-butadiene, isoprene, 2,3-dimethylbutadiene, and vinyl aromatic monomers, such as vinyl, divinyl, or trivinyl benzene monomers, including styrene, α-methyl styrene, p-tertiary-butyl styrene, methyl vinyl toluene, p-vinyl toluene. In one example, the monomer is 1,3 butadiene. In another example, the monomers include 1,3 butadiene and styrene. For purposes herein, a rubbery polymer includes a high trans microstructure content if the trans microstructure content, e.g., trans 1,4 polybutadiene, of a polymerized conjugated diolefin monomer, such as 1,3 butadiene, is greater than 60% of its total microstructure content.

The polymerizations are typically carried out in a hydrocarbon solvent, such as one or more aromatic, paraffinic or cycloparaffinic compounds. The solvents generally will contain from 4 to 10 carbon atoms per molecule and will be liquid under the conditions of the polymerization. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, and petroleum naphtha, alone or in admixture. In the solution polymerizations, there typically will be from 5 to 30 weight percent monomers in the polymerization medium. Such polymerization media are comprised of the organic solvent and monomers. In another example, the polymerization medium may contain from 10 to 25 weight percent monomers. In yet another example, the polymerization medium can contain 15 to 20 weight percent monomers.

The solution styrene-butadiene rubbers made utilizing the catalyst system include repeat units that are derived from the conjugated diolefin monomers and optionally vinyl aromatic monomers, such as styrene. The styrene-butadiene rubbers will typically contain from about 2 weight percent to about 50 weight percent styrene and from about 50 weight percent to about 98 weight percent 1,3-butadiene. However, in some cases, the amount of styrene included will be as low as about 1 weight percent. In another example, the styrene-butadiene rubbers will contain from about 3 weight percent to about 30 weight percent styrene and from about 70 weight percent to about 97 weight percent 1,3-butadiene. In another example, the styrene-butadiene rubbers will contain from about 3 weight percent to about 25 weight percent styrene and from about 75 weight percent to about 97 weight percent 1,3-butadiene.

Styrene-butadiene copolymer resins containing from about 50 weight percent to about 95 weight percent styrene and from about 5 weight percent to about 50 weight percent 1,3-butadiene can also be synthesized using the catalyst system. Such copolymers having glass transition temperatures within the range of 7° C. to 70° C. can be used as toner resins.

In the styrene-butadiene rubbers containing less than about 30 weight percent bound styrene, the distribution of repeat units derived from styrene and butadiene is essentially random. The term "random" as used herein means that less than 10 percent of the total quantity of repeat units derived from styrene are in blocks containing more than five styrene repeat units. In other words, more than 90 percent of the repeat units derived from styrene are in blocks containing five or fewer repeat units. About 20% of the repeat units derived from styrene will be in blocks containing only one styrene repeat unit. Such blocks containing one styrene repeat unit are bound on both sides by repeat units that are derived from 1,3-butadiene.

In styrene-butadiene rubbers containing less than about 20 weight percent bound styrene, less than 4 percent of the total quantity of repeat units derived from styrene are in blocks containing five or more styrene repeat units. In other words, more than 96 percent of the repeat units derived from styrene are in blocks containing less than five repeat units. In such styrene-butadiene rubbers, over 25 percent of repeat units derived from styrene will be in blocks containing only one styrene repeat unit, over 60 percent of the repeat units derived from styrene will be in blocks containing less than 3 repeat units, and over 90 percent of the repeat units derived from styrene will be in blocks containing 4 or fewer repeat units.

In styrene-butadiene rubbers containing less than about 10 weight percent bound styrene, less than 1 percent of the total quantity of repeat units derived from styrene are in blocks containing 5 or more styrene repeat units. In other words, more than 99 percent of the repeat units derived from styrene are in blocks containing 4 or less repeat units. In such styrene-butadiene rubbers, at least about 50 percent of repeat units derived from styrene will be in blocks containing only one styrene repeat unit and over about 85 percent of the repeat units derived from styrene will be in blocks containing less than 3 repeat units.

The styrene-butadiene copolymers also tend to have a consistent composition throughout their polymer chains. In other words, the styrene content of the polymer will be about the same from the beginning to the end of the polymer chain. In one example, no segments of at least 100 repeat units within the polymer will have a styrene content which differs from the total styrene content of the polymer by more than about 10 percent. In another example, such styrene-butadiene copolymers will contain no segments having a length of at least 100 repeat units that have a styrene content which differs from the total styrene content of the polymer by more than about 5 percent. Additionally, the styrene-butadiene copolymers of this invention having bound styrene contents of up to at least about 42 percent are soluble in mixed hexane solvents.

The polymerizations of this invention are initiated by adding the amine containing catalyst system to a polymerization medium, or premix, containing the monomers to be polymerized. The catalyst system may be added to the premix in any desired amount. In one example, the catalyst system is provided in an amount of about 0.100 mmole to about 0.900 mmol/per 100 parts by weight of total monomer. In another example, the catalyst system is provided in an amount of about 0.200 mmole to about 0.700 mmol/per 100 parts by weight of total monomer. The polymerizations can be carried out utilizing batch, semi-continuous or continuous techniques, as known to those having ordinary skill in the art.

The polymerization is conducted for a length of time sufficient to permit substantially complete polymerization of monomers. In other words, the polymerization is normally carried out until high conversions are attained. The polymerization temperature utilized can vary over a broad temperature range of from about 20° C. to about 180° C. In another example, a temperature within the range of about 40° C. to about 120° C. can be utilized. In yet another example, the polymerization temperature can be within the range of about 70° C. to about 100° C. The pressure used will normally be sufficient to maintain a substantially liquid phase under the conditions of the polymerization reaction.

After the polymerization or copolymerization has been completed, the styrene-butadiene rubber, for example, can be recovered from the organic solvent. The rubbery polymer, such as styrene-butadiene rubber, can be recovered from the organic solvent and residue by means such as decantation, filtration, centrification, and others known to those having ordinary skill in the art. It can be desirable to precipitate the polymer from the organic solvent by the addition of lower alcohols containing from about 1 to about 4 carbon atoms to the polymer solution. Suitable lower alcohols for precipitation of the segmented polymer from the polymer cement include methanol, ethanol, isopropyl alcohol, normal-propyl alcohol and t-butyl alcohol. The utilization of lower alcohols to precipitate the rubber from the polymer cement also "kills" or terminates the living polymer by inactivating lithium end groups. The polymerization can also be terminated with other conventional noncoupling types of terminators, such as water, an acid, or with a coupling agent, for example. After the polymer is recovered from the solution, steam-stripping can be employed to reduce the level of volatile organic compounds in the rubber.

There are certain benefits in tire tread compounds derived from the rubbery polymers made with the amine containing catalyst systems. For example, styrene-butadiene rubber made with the amine catalyst system can be blended with natural rubber to make tread compounds for passenger tires that exhibit desirable rolling resistance, traction, tear, and tread wear characteristics. In cases where tread wear is of great importance, high cis-1,4-polybutadiene can also be included in the blend. In any case, the styrene-butadiene rubbers of this invention can be used to improve the traction, tread wear and rolling resistance of tires made therewith.

Non-limiting examples of the catalyst system in accordance with the description are now disclosed below. These examples are merely for the purpose of illustration and are not to be regarded as limiting the scope of the invention or the manner in which it can be practiced. Other examples will be appreciated by a person having ordinary skill in the art. Unless specifically indicated otherwise, parts and percentages are given by weight.

EXAMPLE 1

In this experiment, 1063 g silica/alumna/molecular sieve-dried premix containing 18.8 weight percent 1,3 butadiene was charged into a one-gallon reactor. 1.22 mL of 0.47M solution of barium salt of di(ethylene glycol) ethylether (BaDEGEE) in ethylbenzene, 2.29 mL of a 1.0M solution of tri-n-octylaluminum (TOA) in hexanes, 1.71 mL of 0.99M solution of n-butyllithium (n-BuLi) in hexanes, and 0.57 mL of 1.0M of piperazine in hexanes were added to the reactor. The molar ratio of BaDEGEE to TOA to n-BuLi and to Piperazine was 1:4:3:1.

The polymerization was carried out at 90° C. The GC analysis of the residual monomer contained in the polymerization mixture indicated that the monomer conversions at 80 minutes and 100 minutes were 89.5% and 92.4%, respectively. 3 ml of 1.0M ethanol was added to shortstop the polymerization. The polymer cement was then removed from the reactor and stabilized with 1 phm antioxidant. After evaporating hexanes, the resulting polymer was dried in a vacuum oven at 50° C.

The polybutadiene produced was determined to have a glass transition temperature (Tg) at −92° C. and a melting temperature (Tm) at +35.6° C. The Mooney viscosity (ML-4) at 100° C. was 89. The GPC measurements indicated that the polymer has a number average molecular weight (Mn) of 210,000 g/mol and a weight average molecular weight (Mw) of 464,500 g/mol. The polydispersity (Mw/Mn) of the resulting polymer was 1.61. Carbon-13 NMR analysis showed a trans 1,4 polybutadiene content of 83%, cis 1,4 polybutadiene content of 12.5%, and a 1,2 polybutadiene content of 4.5%.

EXAMPLE 2

The procedure described in Example 1 was utilized in this example except that 3.43 mL of 1.0 M solution of piperazine in hexanes was added. Therefore, making the molar ratio (BaDEGEE/TOA/n-BuLi/piperazine) 1:4:3:6. The GC analysis of the residual monomer contained in the polymerization mixture indicated that the monomer conversions at 4 hours and 7 hours were 91.0% and 94.7%, respectively. The resulting polybutadiene polymer was determined to have a Tg at −90° C. and a Tm at +38.0° C. The Mooney viscosity (ML-4) at 10° C. was 89. The Mn and the Mw of the resulting polymer were 400,100 g/mol and 610,300 g/mol, resulting in a polydispersity of 2.23. Carbon-13 NMR analysis showed a trans 1,4 polybutadiene content of 84.7%, cis 1,4 polybutadiene content of 11.10%, and a 1,2 polybutadiene content of 4.2%.

EXAMPLE 3

In this experiment, 986 g of a silica/alumna/molecular sieve-dried premix containing 20.27 weight percent 1,3 butadiene and 900 g of hexane were charged into a one-gallon reactor. 2.0 mL of 0.5M solution of barium salt of di(ethylene glycol) ethylether (BaDEGEE) in ethylbenzene; 4 mL of a 1.0M solution of tri-n-octylaluminum (TOA) in hexanes; 3 mL of 0.99M solution of n-butyllithium (n-BuLi)

in hexanes; and 1.0 mL of 1.0M of N-methyl piperazine in hexanes were added to the reactor. The molar ratio of BaDEGEE to TOA to n-BuLi and to N-methyl piperazine was 1:4:3:1.

The polymerization was carried out at 90° C. The GC analysis of the residual monomer contained in the polymerization mixture indicated that the monomer conversions at 150 and 300 minutes were 99.1% and 99.9%, respectively. 3 mL of 1.0M ethanol was added to shortstop the polymerization. The polymer cement was then removed from the reactor and stabilized with 1 phm of antioxidant. After evaporating hexanes, the resulting polymer was dried in a vacuum oven at 50° C.

The polybutadiene produced was determined to have a glass transition temperature (Tg) at −95.7° C. and a melting temperature (Tm) at +35.0° C. The Mooney viscosity (ML-4) at 100° C. was 104. The GPC measurements indicated that the polymer has a number average molecular weight (Mn) of 250,200 g/mol and a weight average molecular weight (Mw) of 471,900 g/mol. The polydispersity (Mw/Mn) of the resulting polymer was 1.11. Carbon-13 NMR analysis showed a trans 1,4 polybutadiene content of 83.9%, cis 1,4 polybutadiene content of 11.5%, and a 1,2 polybutadiene content of 4.6%.

EXAMPLE 4

The procedure described in Example 3 was utilized in this example except that 2.0 mL of 1.0M solution of N,N'-dimethylpiperazine in hexanes was added, making the molar ratio (BaDEGEE/TOA/n-BuLi/N,N'-Dimethylpiperazine) 1:4:3:2. The GC analysis of the residual monomer contained in the polymerization mixture indicated that the monomer conversions at 300 minutes and 350 minutes were 99.5% and 100% respectively. The resulting polybutadiene polymer was determined to have a Tg at −87.7° C. and a Tm at +40.9° C. The Mooney viscosity (ML-4) at 100° C. was 86. The Mn and the Mw of the resulting polymer were 316,300 g/mol and 521,200 g/mol, resulting in a polydispersity of 1.65. Carbon-13 NMR analysis showed a trans 1,4 polybutadiene content of 81.9%, cis 1,4 polybutadiene content of 13.8%, and a 1,2 polybutadiene content of 4.3%.

EXAMPLE 5

In this experiment, 1038 g of a silica/alumna/molecular sieve-dried premix containing 19.3 weight percent 1,3 butadiene was charged into a one-gallon reactor. 1.22 mL of 0.47M solution of barium salt of di(ethylene glycol) ethylether (BaDEGEE) in ethylbenzene; 2.29 mL of a 1.0M solution of tri-n-octylaluminum (TOA) in hexanes; 1.71 mL of 0.99M solution of n-butyllithium (n-BuLi) in hexanes; and 0.571 mL of 1.0M of DABCO (1,4-diazabicyclo [2.2.2] octane) in hexanes were added to the reactor. The molar ratio of BaDEGEE to TOA to n-BuLi and to DABCO was 1:4:3:1.

The polymerization was carried out at 90° C. The GC analysis of the residual monomer contained in the polymerization mixture indicated that the monomer conversions at 120 and 190 minutes were 89.7% and 93.4%, respectively. 3 mL of 1.0M ethanol was added to shortstop the polymerization. The polymer cement was then removed from the reactor and stabilized with 1 phm of antioxidant. After evaporating hexanes, the resulting polymer was dried in a vacuum oven at 50° C.

The polybutadiene produced was determined to have a glass transition temperature (Tg) at −90.9° C. and a melting temperature (Tm) at +14.8° C. The Mooney viscosity (ML-4) at 100° C. was 133. The GPC measurements indicated that the polymer has a number average molecular weight (Mn) of 229,900 g/mol and a weight average molecular weight (Mw) of 349,000 g/mol. The polydispersity (Mw/Mn) of the resulting polymer was 1.52. Carbon-13 NMR analysis showed a trans 1,4 polybutadiene content of 78.1%, cis 1,4 polybutadiene content of 17.2%, and a 1,2 polybutadiene content of 4.7%.

EXAMPLE 6

The procedure described in Example 5 was utilized in this example except that 1.43 mL of 1.0M solution of DABCO in hexanes was added, making the molar ratio (BaDEGEE/TOA/n-BuLi/DABCO) 1:4:3:2.5. The GC analysis of the residual monomer contained in the polymerization mixture indicated that the monomer conversions at 272 minutes and 345 minutes were 70.7% and 76.3%, respectively. The resulting polybutadiene polymer was determined to have a Tg at −90.8° C. and a Tm at +20° C. The Mooney viscosity (ML-4) at 100° C. was 45. The Mn and the Mw of the resulting polymer were 136,700 g/mol and 500,500 g/mol, resulting in a polydispersity of 3.66. Carbon-13 NMR analysis showed a trans 1,4 polybutadiene content of 65.9%, a cis 1,4 polybutadiene content of 22.3%, and a 1,2 polybutadiene content of 11.8%.

EXAMPLE 7

The procedure described in Example 5 was utilized in this example except that 2.29 mL of 1.0M solution of DABCO in hexanes was added, making the molar ratio (BaDEGEE/TOA/n-BuLi/DABCO) 1:4:3:4. The GC analysis of the residual monomer contained in the polymerization mixture indicated that the monomer conversions at 220 minutes and 360 minutes were 59.7% and 72.9%, respectively. The resulting polybutadiene polymer was determined to have a Tg at −89.1° C. and a Tm at −13.2° C. The Mooney viscosity (ML-4) at 100° C. was 37. The Mn and the Mw of the resulting polymer were 118,400 g/mol and 435,400 g/mol, resulting in a polydispersity of 3.68. Carbon-13 NMR analysis showed a trans 1,4 polybutadiene content of 62.5%, a cis 1,4 polybutadiene content of 21.0%, and a 1,2 polybutadiene content of 16.5%.

EXAMPLE 8

The procedure described in Example 5 was utilized in this example except that 3.43 mL of 1.0M solution of DABCO in hexanes was added, making the molar ratio (BaDEGEE/TOA/n-BuLi/DABCO) 1:4:3:6. The GC analysis of the residual monomer contained in the polymerization mixture indicated that the monomer conversions at 7 hours and 22 hours were 82.2% and 92.4%, respectively. The resulting polybutadiene polymer was determined to have a Tg at −84.8° C. and it had no Tm. The Mooney viscosity (ML-4) at 100° C. was 19. The Mn and the Mw of the resulting polymer were 112,700 g/mol and 344,600 g/mol, resulting in a polydispersity of 3.06. Carbon-13 NMR analysis showed a trans 1,4 polybutadiene content of 65.9%, a cis 1,4 polybutadiene content of 22.3%, and 1,2 polybutadiene content of 11.8%.

EXAMPLE 9

In this experiment, 1442 g of a silica/alumna/molecular sieve-dried premix containing 20.8 weight percent 1,3 butadiene was charged into a one-gallon reactor. 2.13 mL of 0.56M solution of barium salt of di(ethylene glycol) ethylether (BaDEGEE) in ethylbenzene; 4.8 mL of a 1.0M solution of tri-n-octylaluminum (TOA) in hexanes; 3.55 mL of 1.015M solution of n-butyllithium (n-BuLi) in hexanes; and 1.2 mL of 1.0M para-aminophenol (AP) in hexanes were added to the reactor. The molar ratio of BaDEGEE to TOA to n-BuLi and to AP was 1:4:3:1.

The polymerization was carried out at 90° C. The GC analysis of the residual monomer contained in the polymerization mixture indicated that the monomer conversions at 200 and 196.5 minutes were 93.9% and 95.8%, respectively. 3 mL of 1.0M ethanol was added to shortstop the polymerization. The polymer cement was then removed from the reactor and stabilized with 1 phm of antioxidant. After evaporating hexanes, the resulting polymer was dried in a vacuum oven at 50° C.

The polybutadiene produced was determined to have a glass transition temperature (Tg) at −95.2° C. and had a dual melting temperature (Tm) at +34.8° C. and 35.7° C. The GPC measurements indicated that the polymer has a number average molecular weight (Mn) of 101,380 g/mol and a weight average molecular weight (Mw) of 234,600 g/mol. The polydispersity (Mw/Mn) of the resulting polymer was 1.65. Carbon-13 NMR analysis showed a trans 1,4 polybutadiene content of 82.7%, cis 1,4 polybutadiene content of 13.3%, and a 1,2 polybutadiene content of 4.0%.

EXAMPLE 10

The procedure described in Example 9 was utilized in this example except that 2.4 mL of 1.0M solution of para-aminobenzoic acid (PABA) in hexanes was added, making the molar ratio (BaDEGEE/TOA/n-BuLi/PABA) 1:4:3:2. The GC analysis of the residual monomer contained in the polymerization mixture indicated that the monomer conversions at 360 minutes and 400 minutes were 92.1% and 92.5%, respectively. The resulting polybutadiene polymer was determined to have a Tg at −91.9° C. and a Tm at −24.8° C. The Mn and the Mw of the resulting polymer were 63,160 g/mol and 148,000 g/mol, resulting in a polydispersity of 2.34. Carbon-13 NMR analysis showed a trans 1,4 polybutadiene content of 86.3%, cis 1,4 polybutadiene content of 19.5%, and a 1,2 polybutadiene content of 4.2%.

EXAMPLE 11

In this experiment, 1298 g silica/alumna/molecular sieve-dried premix containing 148.5 g of styrene and butadiene monomers, which included 80.8 weight percent 1,3 butadiene and 19.2 weight percent styrene, was charged into a one-gallon reactor. 2.13 mL of 0.56M solution of barium salt of di(ethylene glycol) ethylether (BaDEGEE); 4.8 mL of a 1.0M solution of tri-n-octylaluminum (TOA) in hexanes; 3.55 mL of 1.015M solution of n-butyllithium (n-BuLi) in hexanes; and 1.2 mL of 1.0M of Pyrrole in hexanes were added to the reactor. The molar ratio of BaDEGEE to TOA to n-BuLi and to Pyrrole was 1:4:3:1.

The polymerization was carried out at 90° C. The GC analysis of the residual monomer contained in the polymerization mixture indicated that the total monomer conversions at 150 and 251 minutes were 92.9% and 95.21%, respectively. Three mL of 1.0M ethanol was added to shortstop the polymerization. The polymer cement was then removed from the reactor and stabilized with 1 phm of antioxidant. After evaporating hexanes, the resulting polymer was dried in a vacuum oven at 50° C.

The styrene-butadiene produced was determined to have a glass transition temperature (Tg) at −82.7° C. and a melting temperature (Tm) at +28.36° C. The Mooney viscosity (ML-4) at 100° C. was 78. The polymer had a number average molecular weight (Mn) of 188,500 g/mol and a weight average molecular weight (Mw) of 282,800 g/mol. The polydispersity (Mw/Mn) of the resulting polymer was 1.32. Based on the Tg and Tm, the microstructure content was predicted to include a trans 1,4 polybutadiene content of about 78%, cis 1,4 polybutadiene content of about 16%, a 1,2 polybutadiene content of about 6%, and a polystyrene content of about 15%.

EXAMPLE 12

The procedure described in Example 11 was utilized in this example except that 2.4 mL of 1.0M solution of pyrimidine in hexanes was added, making the molar ratio (BaDEGEE/TOA/n-BuLi/pyrimidine) 1:4:3:2. The GC analysis of the residual monomer contained in the polymerization mixture indicated that the total monomer conversions at 116 minutes and 226 minutes were 77.2% and 90.1%, respectively. The resulting styrene-butadiene polymer was determined to have a Tg at −82.1° C. and a Tm at +17.1° C. The Mn and the Mw of the resulting polymer were 268,700 g/mol and 428,900 g/mol, resulting in a polydispersity of 1.36. Based on the Tg and Tm, the microstructure content was predicted to include a trans 1,4 polybutadiene content of about 79%, cis 1,4 polybutadiene content of about 14%, a 1,2 polybutadiene content of about 7%, and a polystyrene content of 17%.

EXAMPLE 13

The procedure described in Example 11 was utilized in this example except that 3.6 mL of 1.0M solution of 2-picoline in hexanes was added, making the molar ratio (BaDEGEE/TOA/n-BuLi/2-picoline) 1:4:3:3. The GC analysis of the residual monomer contained in the polymerization mixture indicated that the total monomer conversions at 250 minutes and 333 minutes were 90.22% and 94.1%, respectively. The resulting styrene-butadiene polymer was determined to have a Tg at −84.4° C. and a Tm at +33.2° C. The Mooney viscosity (ML-4) at 100° C. was 99. The Mn and the Mw of the resulting polymer were 239,300 g/mol and 335,500 g/mol, resulting in a polydispersity of 1.40. Based on the Tg and Tm, the microstructure content was predicted to include a trans 1,4 polybutadiene content of about 82%, cis 1,4 polybutadiene content of about 11%, a 1,2 polybutadiene content of about 7%, and a polystyrene content of 17%.

EXAMPLE 14

The procedure described in Example 11 was utilized in this example except that 4.8 mL of 1.0M solution of 4-picoline in hexanes was added, making the molar ratio (BaDEGEE/TOA/n-BuLi/4-picoline) 1:4:3:4. The GC analysis of the residual monomer contained in the polymerization mixture indicated that the total monomer conversions at 262 minutes and 20 hours were 87.5% and 96.9%, respectively. The resulting styrene-butadiene polymer was determined to have a Tg at −83.4° C. and a Tm at +30.2° C. The Mn and the Mw of the resulting polymer were 356,100 g/mol and 432,600 g/mol, resulting in a polydispersity of 1.69. Based on the Tg and Tm, the microstructure content was predicted to include a trans 1,4 polybutadiene content of about 77%, cis 1,4 polybutadiene content of about 16%, a 1,2 polybutadiene content of about 7%, and a polystyrene content of about 17%.

EXAMPLE 15

The procedure described in Example 11 was utilized in this example except that 7.2 mL of 1.0M solution of 3-picoline in hexanes was added. Therefore, making the molar ratio (BaDEGEE/TOA/n-BuLi/3-picoline) 1:4:3:6. The GC analysis of the residual monomer contained in the polymerization mixture indicated that the total monomer conversions at 310 minutes and 500 minutes were 80.7% and 94.3%, respectively. The resulting styrene-butadiene polymer was determined to have a Tg at −85.2° C. and a Tm at +19.9° C. The Mooney viscosity (ML-4) at 1001 was 92.4. The Mn and the Mw of the resulting polymer were 225,000 g/mol and 434,300 g/mol, resulting in a polydispersity of 1.93. Based on the Tg and Tm, the microstructure content was predicted to include a trans 1,4 polybutadiene content of about 67%, cis 1,4 polybutadiene content of about 26%, a 1,2 polybutadiene content of about 6%, and a polystyrene content of about 18%.

EXAMPLE 16

In this experiment, 1298 g silica/alumna/molecular sieve-dried premix containing 148.5 g of styrene and butadiene monomers, which included 80.8 weight percent 1,3 butadiene and 19.2 weight percent styrene, was charged into a one-gallon reactor. 2.13 mL of 0.56M solution of barium salt of di(ethylene glycol) ethylether (BaDEGEE); 4.8 mL of a 1.0M solution of tri-n-octylaluminum (TOA) in hexanes; 3.55 mL of 1.015M solution of n-butyllithium (n-BuLi) in hexanes; and 2.4 mL of 1.0M of pyridine in hexanes were added to the reactor. The molar ratio of BaDEGEE to TOA to n-BuLi and to pyridine was 1:4:3:2.

The polymerization was carried out at 90° C. The GC analysis of the residual monomer contained in the polymerization mixture indicated that the total monomer conversions at 180 and 239 minutes were 91.7% and 93.6%, respectively. 3 mL of 1.0M ethanol was added to shortstop the polymerization. The polymer cement was then removed from the reactor and stabilized with 1 phm of antioxidant. After evaporating hexanes, the resulting polymer was dried in a vacuum oven at 50° C.

The styrene-butadiene produced was determined to have a glass transition temperature (Tg) at −76° C. and a melting temperature (Tm) at +14° C. The Mooney viscosity (ML-4) at 100° was 80. The polymer had a number average molecular weight (Mn) of 243,600 g/mol and a weight average molecular weight (Mw) of 492,000 g/mol. The polydispersity (Mw/Mn) of the resulting polymer was 1.34. Based on the Tg and Tm, the microstructure content was predicted to include a trans 1,4 polybutadiene content of about 65%, cis 1,4 polybutadiene content of about 28%, a 1,2 polybutadiene content of about 7%, and a polystyrene content of about 15%.

EXAMPLE 17

In this experiment, 1308 g silica/alumna/molecular sieve-dried premix containing 133.6 g of styrene and butadiene monomers, which included 80.6 weight percent 1,3 butadiene and 19.4 weight percent styrene, was charged into a one-gallon reactor. 2.13 mL of 0.56M solution of barium salt of di(ethylene glycol) ethylether (BaDEGEE Chemetal); 4.8 mL of a 1.0M solution of tri-n-octylaluminum (TOA) in hexanes; 3.55 mL of 1.015M solution of n-butyllithium (n-BuLi) in hexanes; and 2.4 mL of 1.0M of DABCO in hexanes were added to the reactor. The molar ratio of BaDEGEE to TOA to n-BuLi and to DABCO was 1:4:3:2.

The polymerization was carried out at 90° C. The GC analysis of the residual monomer contained in the polymerization mixture indicated that the total monomer conversions at 120 and 240 minutes were 88.2% and 97.1%, respectively. 3 mL of 1.0M ethanol was added to shortstop the polymerization. The polymer cement was then removed from the reactor and stabilized with 1 phm of antioxidant. After evaporating hexanes, the resulting polymer was dried in a vacuum oven at 50° C.

The styrene-butadiene produced was determined to have a glass transition temperature (Tg) at −76° C. and a melting temperature (Tm) at +12° C. The Mooney viscosity (ML-4) at 100° was 75. The polymer had a number average molecular weight (Mn) of 123,300 g/mol and a weight average molecular weight (Mw) of 208,400 g/mol. The polydispersity (Mw/Mn) of the resulting polymer was 1.69. Based on the Tg and Tm, the microstructure content was predicted to include a trans 1,4 polybutadiene content of about 77%, cis 1,4 polybutadiene content of about 18%, a 1,2 polybutadiene content of about 5%, and a polystyrene content of about 17%.

EXAMPLE 18

In this experiment, 2000 g silica/alumna/molecular sieve-dried premix containing 145 g of styrene and butadiene monomers, which included 70 weight percent 1,3 butadiene and 30 weight percent styrene, was charged into a one-gallon reactor. 2.13 mL of 0.56M solution of barium salt of di(ethylene glycol) ethylether (BaDEGEE); 4.8 mL of a 1.0M solution of tri-n-octylaluminum (TOA) in hexanes; 3.55 mL of 1.015M solution of n-butyllithium (n-BuLi) in hexanes; and 2.4 mL of 1.0M of octyl amine in hexanes were added to the reactor. The molar ratio of BaDEGEE to TOA to n-BuLi and to octyl amine was 1:4:3:2.

The polymerization was carried out at 90° C. The GC analysis of the residual monomer contained in the polymerization mixture indicated that the total monomer conversions at 120 and 240 minutes were 92% and 98%. 3 mL of 1.0M ethanol was added to shortstop the polymerization. The polymer cement was then removed from the reactor and stabilized with 1 phm of antioxidant. After evaporating hexanes, the resulting polymer was dried in a vacuum oven at 50° C.

The styrene-butadiene produced was determined to have a glass transition temperature (Tg) at −66° C. and a melting temperature (Tm) at −14° C. The Mooney viscosity (ML-4) at 100° C. was 56. The polymer had a number average molecular weight (Mn) of 123,300 g/mol and a weight average molecular weight (Mw) of 208,400 g/mol. The polydispersity (Mw/Mn) of the resulting polymer was 1.69. Based on the Tg and Tm, the microstructure content was predicted to include a trans 1,4 polybutadiene content of about 73%, cis 1,4 polybutadiene content of about 22%, a 1,2 polybutadiene content of about 5%, and a polystyrene content of about 22%.

Accordingly, the solution polymerizations using the above catalyst systems produced polybutadiene and styrene-butadiene rubbers having high trans microstructure contents as well as desirable glass transition temperatures, for example. Such glass transition temperatures from the above examples indicate low temperature properties. These low temperature properties can translate into rubber compounds with good wearing properties and desirable traction properties suitable for use in tires. Such rubber compounds may further include 100% silica filler, 100% carbon black filler, or mixtures thereof, for example. The presence of a high trans microstructure content, e.g., greater than 60%, is typically beneficial for providing desirable tearing properties which can give desirable endurance to truck tires, for example. Moreover, such crystallizable high-trans polymers can be useful in building tread rubbers in tire making equipment as a result of lower shrinkage and distortion of the tread compound on extrusion. The Mooney data, for example, indicates a rubbery polymer having better wearing and tearing which can be desirable in medium and heavy truck tires for better chipping and chunking. The polydispersity values indicate a rubbery polymer having a more desirable filler and polymer interaction during processing and calendaring, which can lead to improved fuel economies.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative product and method and illustrative examples shown and described. Accordingly, departures may be made from such details without departing from the scope of the general inventive concept.

What is claimed is:

1. A catalyst system comprising:
   an organolithium compound;
   a group IIa metal salt;
   an organoaluminum compound; and
   an amine compound selected from the group consisting of a heterocyclic aromatic compound defined by a substituted or unsubstituted 3-, 4-, or 5-membered ring structure with at least one nitrogen atom as part of the ring, an unsubstituted 6-membered ring structure with one nitrogen atom as part of the ring, a substituted or unsubstituted 6-membered ring structure with at least two nitrogen atoms as part of the ring, quinoline, 2-picoline, 3-picoline, or 4-picoline; a heterocyclic non-aromatic compound defined by a substituted or unsubstituted 3-, 4-, 5-membered ring structure with at least two nitrogen atoms as part of the ring, an unsubstituted 6-membered ring structure with at least two nitrogen atoms as part of the ring, or N,N-dimethyl piperazine, and N-methyl piperazine; an aromatic compound including a ring structure substituted with at least one amine and at least one polar functionality containing group; a bicyclic chelating diamine compound; and an aliphatic amine which includes a $C_8$-$C_{20}$ alkyl group.

2. The catalyst system of claim 1 wherein the heterocyclic aromatic compound is selected from the group consisting of pyrrole, quinoline, pyridine, 2-picoline, 3-picoline, 4-picoline, pyridazine, pyrimidine, and pyrazine.

3. The catalyst system of claim 1 wherein the heterocyclic non-aromatic compound is selected from the group consisting of piperazine, N,N-dimethyl piperazine, and N-methyl piperazine.

4. The catalyst system of claim 1 wherein the ring structure of the aromatic compound is a 3-, 4-, 5-, or 6-membered substituted ring, the substitution including the at least one amino group and the at least one polar functionality containing group.

5. The catalyst system of claim 1 wherein the at least one polar functionality containing group is a carboxyl group or a hydroxyl group.

6. The catalyst system of claim 1 wherein the bicyclic chelating diamine compound is defined by two fused rings with at least one ring including two nitrogen atoms.

7. The catalyst system of claim 1 wherein the aliphatic amine is a primary amine.

8. The catalyst system of claim 1 wherein the heterocyclic aromatic compound is selected from the group consisting of pyrrole, quinoline, pyridine, 2-picoline, 3-picoline, 4-picoline, pyridazine, pyrimidine, and pyrazine; wherein the heterocyclic non-aromatic compound is selected from the group consisting of piperazine, N,N-dimethyl piperazine, and N-methyl piperazine; wherein the aromatic compound is para-aminobenzoic acid (PABA) or para-aminophenol (AP); wherein the bicyclic chelating diamine compound is 1,4-diazabicyclo[2.2.2]octane (DABCO); and wherein the aliphatic amine is octyl amine.

9. The catalyst system of claim 1 wherein the group IIa metal salt is selected from the group consisting of group IIa metal salts of amino glycol and group IIa metal salts of glycol ethers.

10. The catalyst system of claim 1 further including an organomagnesium compounds.

11. A method comprising:
    polymerizing a conjugated diolefin monomer in the presence of a catalyst system for synthesizing rubbery polymers having a high trans microstructure, the catalyst system comprising:
    an organolithium compound;
    a group IIa metal salt;
    an organoaluminum compound; and
    an amine compound selected from the group consisting of a heterocyclic aromatic compound defined by a substituted or unsubstituted 3-, 4-, or 5-membered ring structure with at least one nitrogen atom as part of the ring, an unsubstituted 6-membered ring structure with one nitrogen atom as part of the ring, a substituted or unsubstituted 6-membered ring structure with at least two nitrogen atoms as part of the ring, quinoline, 2-picoline, 3-picoline, or 4-picoline; a heterocyclic non-aromatic compound defined by a substituted or unsubstituted 3-, 4-, 5-membered ring structure with at least two nitrogen atoms as part of the ring, an unsubstituted 6-membered ring structure with at least two nitrogen atoms as part of the ring, or N,N-dimethyl piperazine, and N-methyl piperazine; an aromatic compound including a ring structure substituted with at least one amine and at least one polar functionality containing group; a bicyclic chelating diamine compound; and an aliphatic amine which includes a $C_8$-$C_{20}$ alkyl group.

12. The method of claim 11 wherein polymerizing the conjugated diolefin monomer in the presence of the catalyst system comprises polymerizing at a temperature that is within the range of about 40° C. to about 120° C.

13. The method of claim 11 wherein polymerizing the conjugated diolefin monomer in the presence of the catalyst system comprises copolymerizing styrene with the conjugated diolefin monomer in the presence of the catalyst system.

14. The method of claim 13 wherein the rubbery polymer having a high trans microstructure is styrene-butadiene rubber and wherein the conjugated diolefin monomer is 1,3-butadiene.

15. The method of claim 11 wherein a molar ratio of the amine compound to the group IIa metal salt is within the range of about 0.1:1 to about 20:1.

16. The method of claim 11 wherein the amine compound is present in an amount within the range of about 0.20 to about 8.00 phm (parts by 100 parts by weight of total monomer).

17. The method of claim 11 wherein the heterocyclic aromatic compound is selected from the group consisting of pyrrole, quinoline, pyridine, 2-picoline, 3-picoline, 4-picoline, pyridazine, pyrimidine, and pyrazine; wherein the heterocyclic non-aromatic compound is selected from the group consisting of piperazine, N,N-dimethyl piperazine, and N-methyl piperazine; wherein the ring structure of the aromatic compound is a 3-, 4-, 5-, or 6-membered substituted ring, the substitution including the at least one amino group and the at least one polar functionality containing group; wherein the bicyclic chelating diamine compound is defined by two fused rings with at least one ring including two nitrogen atoms; and wherein the aliphatic amine is a primary amine.

\* \* \* \* \*

UNITED STATES PATENT AND TRADEMARK OFFICE
CERTIFICATE OF CORRECTION

PATENT NO. : 7,321,017 B1
APPLICATION NO. : 11/466920
DATED : January 22, 2008
INVENTOR(S) : Adel Farhan Halasa et al.

It is certified that error appears in the above-identified patent and that said Letters Patent is hereby corrected as shown below:

COLUMN 4 line 37, change "$CR_3$—$XR_2$—O—A—Li" to --$CR_3$–$XR_2$–O-A-Li--.

COLUMN 8 line 18, change "tri-isbutylaluminum" to --tri-isobutylaluminum--.

COLUMN 9 line 28, after "amount" delete --,--.

COLUMN 14 line 52, change "10°C" to --100°C--.

COLUMN 14 line 52, after "C" delete --.--.

COLUMN 19 line 16, change "1001" to --100°C--.

COLUMN 19 line 50, after "100°" insert --C--.

COLUMN 20 line 18, after "100°" insert --C--.

UNITED STATES PATENT AND TRADEMARK OFFICE
CERTIFICATE OF CORRECTION

PATENT NO. : 7,321,017 B1
APPLICATION NO. : 11/466920
DATED : January 22, 2008
INVENTOR(S) : Adel Farhan Halasa et al.

It is certified that error appears in the above-identified patent and that said Letters Patent is hereby corrected as shown below:

COLUMN 22 line 28, change "compounds" to --compound--.

Signed and Sealed this

Thirty-first Day of March, 2009

JOHN DOLL
*Acting Director of the United States Patent and Trademark Office*